(12) United States Patent
Saarnisaari et al.

(10) Patent No.: US 7,277,500 B2
(45) Date of Patent: Oct. 2, 2007

(54) SIGNAL-PROCESSING METHOD AND A RECEIVER

(75) Inventors: Harri Saarnisaari, Oulu (FI); Pertti Henttu, Varjakka (FI)

(73) Assignee: Nokia Corporation, Espoo (FI)

( * ) Notice: Subject to any disclaimer, the term of this patent is extended or adjusted under 35 U.S.C. 154(b) by 118 days.

(21) Appl. No.: 10/519,482

(22) PCT Filed: Jul. 2, 2003

(86) PCT No.: PCT/FI03/00536

§ 371 (c)(1),
(2), (4) Date: Dec. 30, 2004

(87) PCT Pub. No.: WO2004/006450

PCT Pub. Date: Jan. 15, 2004

(65) Prior Publication Data

US 2006/0062184 A1    Mar. 23, 2006

(30) Foreign Application Priority Data

Jul. 4, 2002    (FI) ................................. 20021317

(51) Int. Cl.
*H04L 27/00*    (2006.01)
*H04L 1/00*    (2006.01)
(52) U.S. Cl. ...................................... 375/316; 375/346
(58) Field of Classification Search ................ 375/285, 375/346, 316, 130, 140, 144, 147, 148, 340; 370/335, 342, 441
See application file for complete search history.

(56) References Cited

U.S. PATENT DOCUMENTS 5,271,038 A    12/1993    Cai 6,011,430 A *    1/2000    Kim .......................... 327/551
6,246,732 B1 *    6/2001    Kobayashi et al. ......... 375/346

(Continued)

FOREIGN PATENT DOCUMENTS

EP    0 930 719 A2    7/1999

(Continued)

OTHER PUBLICATIONS

Tepedelenlioglu, et al., "*Median Filtering for Power Estimation In Mobile Communication Systems*", Third IEEE Signal Processing Workshop on Signal Processing Advances in Wireless Communication, Mar. 20-23, 2001, pp. 229-231.

*Primary Examiner*—Tesfaldet Bocure
(74) *Attorney, Agent, or Firm*—Squire, Sanders & Dempsey L.L.P.

(57) ABSTRACT

The invention relates to a method for processing a signal, in which method a sample set is formed and a set of absolute values is formed. The method includes A) arranging the elements of the absolute value set in the ascending order; B) setting a threshold value; C) determining the number of elements of a reference set to be formed; D) forming a reference set; E) computing a reference value by multiplying the mean or median of the reference set by the threshold value; F) comparing the greatest element of the reference set with the reference value; G) increasing the number of reference set elements; H) reiterating the preceding steps D to G until the predetermined ending condition is fulfilled; I) forming an accepted absolute value set and a sample set by deleting the greatest element from the reference set.

25 Claims, 4 Drawing Sheets

U.S. PATENT DOCUMENTS

| | | | |
|---|---|---|---|
| 6,385,261 B1 * | 5/2002 | Tsuji et al. | 375/346 |
| 6,665,526 B2 * | 12/2003 | Tsuji et al. | 455/296 |
| 2002/0012411 A1 | 1/2002 | Heinzl et al. | |
| 2002/0015459 A1 * | 2/2002 | Happonen et al. | 375/346 |

FOREIGN PATENT DOCUMENTS

| | | |
|---|---|---|
| EP | 1180851 A2 | 2/2002 |
| GB | 2304000 A | 3/1997 |

\* cited by examiner

SIGNAL-PROCESSING METHOD AND A RECEIVER

FIELD

The invention relates to telecommunications systems and to methods and receivers used in them to process a signal.

BACKGROUND

In telecommunications systems, the quality of the received signals is affected by quick, impulsive interference due to various factors, such as multipath propagation, fading of transmitted signals, shadowing, near-far problem and co-channel interference. The impulses disturb the signal-processing methods used in telecommunications systems, due to which estimating the power of a received signal, for instance, may be unsuccessful.

Power estimation is used in radio systems, for instance in estimating the signal-noise ratio and setting threshold values as well as in automatic amplification control. However, the impulses disturb classical power estimation algorithms and can lead to erroneous results. Cancelling impulsive interference is often a prerequisite for the receivers to be able to operate at a sufficient accuracy. For instance in FFT (Fast Fourier Transformation) band-stop filters used in receivers it is important to find the suitable threshold value level, because the performance of the band-stop filter depends to a great extent on the correct threshold level setting. Further, when signal and noise subspaces are separated, different noise-attenuation methods are used in which subspaces are separated on the basis of information-theoretical criteria, such as Akaike and MDL.

It has become more and more common to use so-called robust, i.e. control-weighted methods for cancelling impulsive interference in the telecommunications systems. The robust methods are not sensitive to big changes in individual observation values, such as impulse-like interference in a received signal. The prior art robust methods utilize so-called order statistics, the basic idea of which is to detect and cancel observed interference by properties associated with an observation set arranged on the basis of variable values. One prior art robust method is so-called median-type filtering. This kind of prior art median-type filtering, used for power estimation, is described in greater detail for instance in the publication by C. Tepedelenlioğlu, N. Sidiropoulos, G. B. Giannakis, "Median Filtering For Power Estimation In Mobile Communications Systems", Third IEEE Signal Processing Workshop on Signal Processing Advances in Wireless Communications, Taoyuan, Taiwan, Mar. 20-23, 2001, pp 229-231.

A drawback of the prior art solutions is, however, that the ability to endure impulsive interference is not sufficiently good. Thus, they are not well suited for separating signal and noise subspaces, for instance. In a median-type method according to the prior art, a drawback is that information on the interfering signal is needed in advance to be able to identify the correct interference impulses. Furthermore, it is difficult to implement a median-type method in practice.

BRIEF DESCRIPTION

It is an object of the invention to provide a method and a receiver implementing the method in such a way that drawbacks associated with the prior art can be reduced. This is achieved with a method for processing a signal in a telecommunications system, in which method a sample set is formed from received signals and a set of absolute values is formed from absolute values of sample set elements. The method of the invention comprises A) arranging the elements of the absolute value set in the ascending order; B) setting a threshold value; C) determining the number of elements of a reference set to be formed; D) forming a reference set comprising a predetermined number of elements of the absolute value set in the ascending order; E) computing a reference value by multiplying the mean or median of the reference set by the threshold value; F) comparing the greatest element of the reference set with the reference value; G) increasing the number of reference set elements for forming a new reference set when the greatest reference set element is smaller than the reference value; H) reiterating the preceding steps D to G until a predetermined ending condition is fulfilled; and I) forming an accepted absolute value set and a corresponding sample set by deleting the greatest element from the reference set when the predetermined ending condition is fulfilled.

The invention also relates to a receiver comprising means for forming a sample set from received signals and means for forming a set of absolute values from the absolute values of sample set elements. The receiver according to the invention comprises means A) for arranging the elements of the absolute value set in the ascending order, B) for setting a threshold value; C) for determining the number of elements of a reference set to be formed; D) for forming a reference set comprising a predetermined number of elements of the absolute value set in the order of magnitude; E) for computing a reference value by multiplying the mean or median of the reference set by the threshold value; F) for comparing the greatest element of the reference set with the reference value; G) for increasing the number of reference set elements for forming a new reference set when the greatest reference set element is smaller than the reference value; H) for reiterating the preceding steps D to G until a predetermined ending condition is fulfilled; I) for forming an accepted absolute value set and a corresponding sample set by deleting the greatest element from the reference set when the predetermined ending condition is fulfilled.

The preferred embodiments of the invention are disclosed in the dependent claims.

A plurality of advantages is achieved with the method and receiver according to the invention. A solution is provided that has calculatory efficiency and is simple to implement. Advantages of the presented solution also include that the method operates at very high frequencies of impulse interference and that the interference bandwidth can be increased. The method also has good ability to endure impulsive interference: it functions even if up to 90% of the samples are interfering impulses.

LIST OF DRAWINGS

In the following the invention will be described in greater detail in connection with preferred embodiments, with reference to the attached drawings, in which FIG. 1 shows an example of a telecommunications system according to the proposed solution;

DESCRIPTION OF EMBODIMENTS

Preferred embodiments of the invention can be applied to telecommunications systems that comprise one or more base stations and a number of terminals communicating with one or more base stations. One such a telecommunications system is the broadband WCDMA radio system employing spread-spectrum data transmission. In the following, embodiments are described by using the radio system of FIG. 1 as the example without being restricted to this, as will be obvious to a person skilled in the art.

Figure 1:
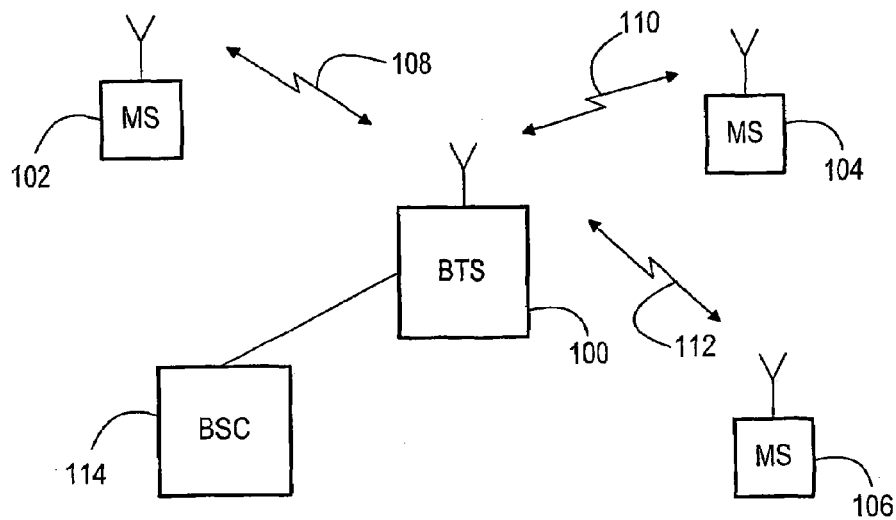

The structure of a telecommunications system can be in essence as shown in FIG. 1. The telecommunications system comprises a base station 100 and a plurality of generally mobile subscriber stations 102 to 106, which have bi-directional connections 108 to 112 to the base station 100. The base station 100 switches the connections of the terminal equipment 102 to 106 to a base station controller 114, which forwards them to other parts of the system and to a fixed network. The base station controller 114 controls the operation of one or more base stations. The base station controller 114 monitors the quality of the radio signal and the transmission power, and takes care of the handover of the mobile station. In addition to the electronic components required for transmitting and receiving radio communication, the base station 100 also comprises signal processors, ASIC circuits and general-purpose processors, which take care of data transmission to the base station controller 114 and control the operation of the base station 100. The base station 100 may comprise one or more transmitter/receiver units. The receiver of the proposed solution can be placed in connection with either the base station 100 or the mobile subscriber stations 102 to 106.

Figure 2:
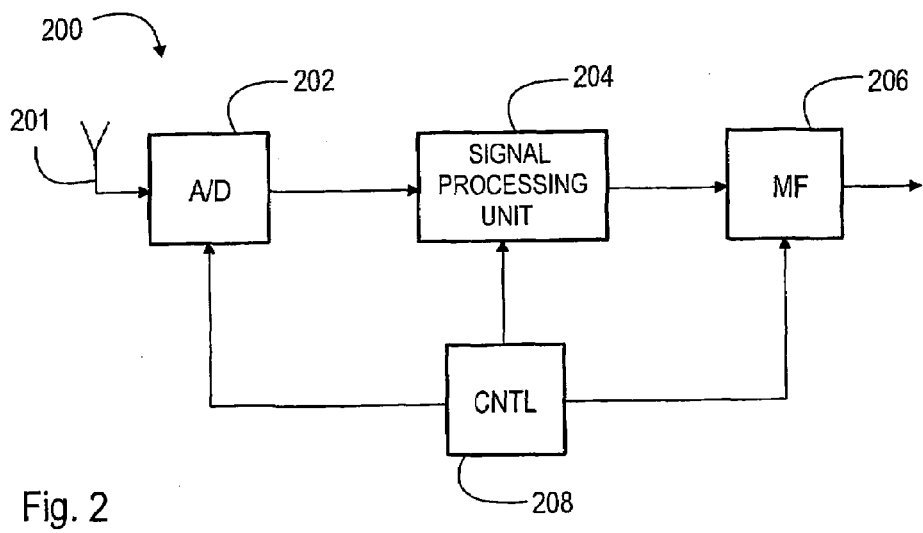
FIG. 2 shows an example of a receiver according to the proposed solution.

FIG. 2 shows an example of a receiver 200 according to the proposed solution. The receiver comprises an A/D converter 202, a signal-processing block 204, an adapted filter 206 and a control unit 208. The receiver may also comprise other means implementing receiver operations, such as speech and channel encoders, modulators and RF parts. In addition, the device comprises an antenna 201, by means of which signals are transmitted and received.

All operations of the receiver 200 are controlled by the control unit 208, which is typically implemented by means of a microprocessor and software or separate components. The A/D converter 202 converts the continuous signal received by the receiver 200 into a digital form. The adapted filter 206 is a specific filter adapted to let only the desired signal pass through with slight signal attenuation and to block all other waveforms (including noise). Prior to the adapted filter 206 the signals are at chip level and after the adapted filter at symbol level. The signal-processing block 204 is implemented by means of ASIC circuits or a microprocessor and software. In the proposed solution it is possible to place also other components between the signal-processing block 204 and the adapted filter 206.

In FIG. 2, sampling, controlled by the control unit 208, in the A/D converter 202 takes place by reading the value of a continuous signal at given intervals. This sampling interval is generally constant in digitizing each signal. After digitizing the signal, the signal-processing block 204 performs operations controlled by the control unit 208.

In an embodiment of the invention, a sample set is first formed in the signal-processing block 204 from the signals received from the A/D converter 202, and an absolute value set is formed from the absolute values of the sample set elements. In the signal-processing block 204, the elements of the absolute value set are arranged in the ascending order, a threshold value is set, and subsequently, the number of reference set elements to be formed is determined, the reference set comprising a predetermined number of elements of the absolute value set in the order of magnitude. In addition, a reference value is determined in the signal-processing block 204, the reference value being the product of the mean of the absolute value set and a predetermined threshold value. Alternatively, the reference value is the product of the median of the absolute value set and the predetermined threshold value. Next, in the signal-processing block 204, the value of the greatest element of the reference set and the reference value are compared with each other, after which the signal-processing block 204 increases the number of reference set elements for forming a new reference set when the greatest element of the reference set is smaller than the reference value. The signal-processing block 204 reiterates these measures until a predetermined ending condition is fulfilled. Subsequently, an accepted absolute value set and a corresponding reference set are formed in the signal-processing block 204 by deleting the greatest element from the remaining reference set.

Since the above-mentioned ending condition is fulfilled when the greatest element of the reference set is greater than the reference value, the measures taken in the receiver 200 cause only the noiseless samples to be accepted from a received signal containing impulsive interference. Thus, the idea is to add the next greatest element of the absolute value set to the reference formed from the elements of the absolute value set each time the greatest element of the reference set is greater than the reference value. As long as the greatest element of the reference set is greater than the reference value, it is certain that this greatest element is noiseless. This is possible because interference impulses have greater absolute values than other samples. Since impulsive interference does not affect the signal quality, accurate power estimation, for example, can be performed for the received signal in the signal-processing block 204 on the basis of the accepted absolute value set and the reference set.

Figure 3:
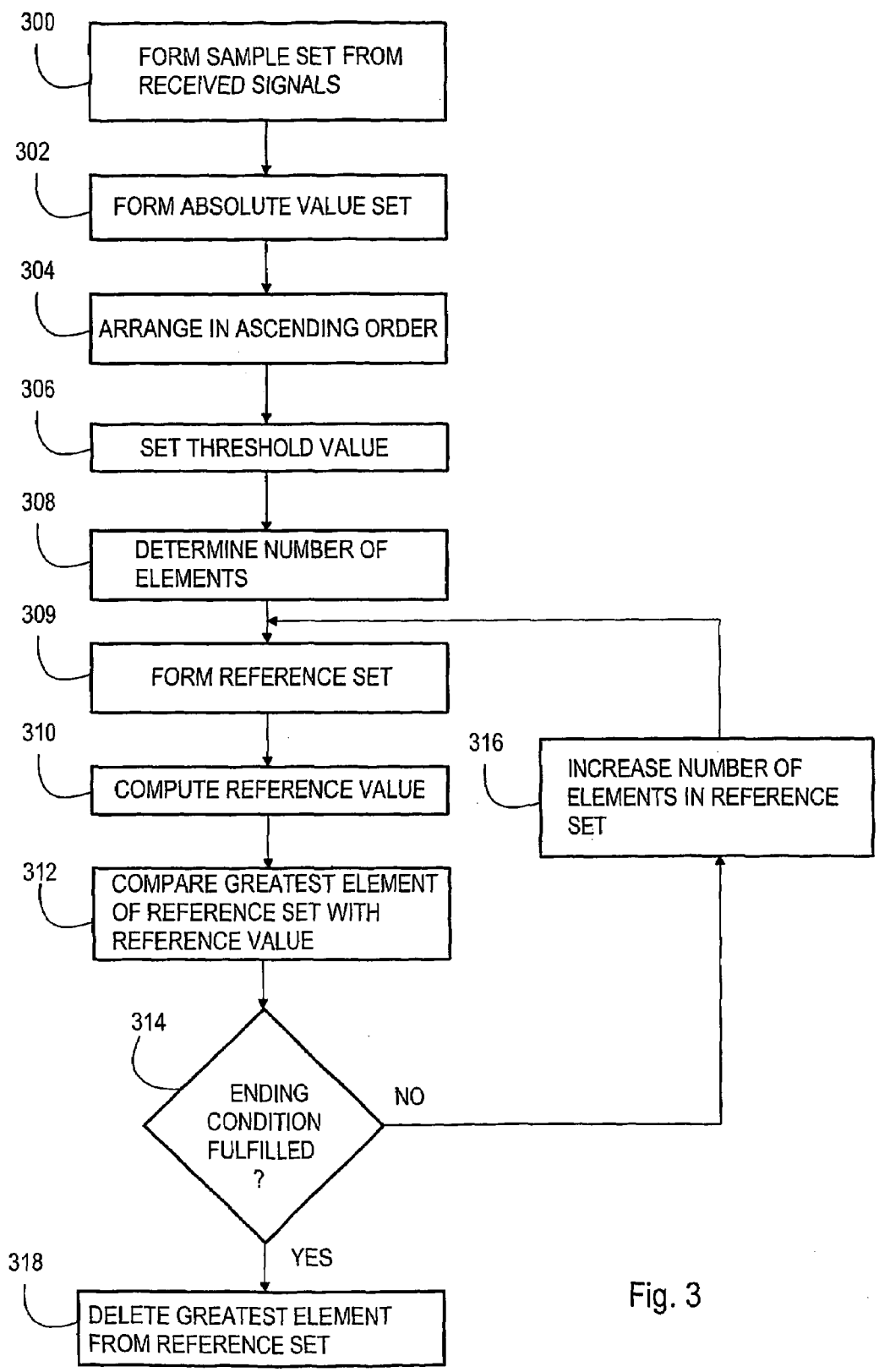
FIG. 3 shows a block diagram of a signal-processing method according to the proposed solution.

FIG. 3 shows a block diagram of a signal-processing method according to an embodiment of the invention. In step 300, a sample set is formed from the received signals. The received signal comprises thermal noise and interference impulses. An object of the method is to cancel the impulsive interference from the received signal prior to processing the received signal further. This is implemented by dividing the received chip-level samples into a desired set and an interference set, which is done by means of a threshold value. The desired set is thus the remaining sample set, from which the interferences have been cancelled. The sample set formed in step 300 is assumed to be Gaussian with zero mean, whereby the amplitude of the sample sequence is Rayleigh-distributed. This situation is achieved in multiple-user DS-CDMA systems, in which the power control works. If, on the other hand, there are only a few users, or the power control does not work, the mean of the variables deviates from zero, whereby the amplitude is Rice-distributed.

After forming the sample set in step 300, the process proceeds to step 302, in which an absolute value set is formed from the absolute values of the sample set elements. As the desired set of chip-level samples is assumed to be Gaussian with zero mean, the absolute value set consisting of the absolute values of the desired set is Rayleigh-distributed. In practice, the desired set is not precisely Gaussian, but the method is simplified by this assumption. The aim of the so-called robust methods is not to find a real model of an adjustable system per se, but to achieve sufficiently good functioning of the system as a whole. For instance, if the sample set comprises a DS signal and thermal noise, the absolute values of these samples are Rice-distributed. The proposed method can still be used in that case, too.

In step 304, the elements of the absolute value set are arranged in the ascending order. Next, in step 306, a threshold value is set that is needed later for computing a reference value. The threshold value is obtained from Rayleigh distribution. Selection of a suitable threshold value is affected by the method used for computing the reference value in a later step 310. If, for instance, the mean of the reference set formed in step 309 is used for computing the reference value and if it is desired that 0.1% of the sample set elements be deleted, the threshold value is advantageously 2.97. If, on the other hand, it is desired that 1% of the sample set elements be deleted, the threshold value is 2.42. The assumption that the desired set is Gaussian with zero mean is sufficient for determining the threshold value. The threshold value 2.97 is an acceptable value in all desired cases independent of Gaussian set variance. In a case of non-interference this particular threshold value 2.97 causes a situation in which only 0.1% of the samples of the desired set is erroneously selected to be impulses. On the other hand, if the median of the reference set formed in step 309 is used, instead of the mean of the reference set, for computing the reference value, and if it is desired that 0.1% of the sample set elements be deleted, the threshold value is advantageously 3.16. Further, if the median of the reference set is used and if it is desired that 1% of the sample set elements be deleted, the threshold value is 2.58. The threshold value is independent of the Gaussian distribution variance.

After setting the threshold value in step 306, the process proceeds to step 308, where the number of elements in the reference set to be formed is determined. In step 309, a reference set is formed which comprises absolute value set elements, the number of which was determined in step 308, in the order of magnitude. The number of elements determined in step 308 is determined to be suitable for the situation. Usually the number is at least three. However, in a case where 90% of the sample set elements are impulses, it is preferable to select at least 10% of the elements of the absolute value set as the number of reference set elements, whereby the reference set comprises 10% of all absolute value elements in the order of magnitude.

In step 310, a reference value is computed by multiplying the mean or median of the reference set by a predetermined threshold value. Thus, the mean or median of the reference set is selected for computing the reference value. However, selection of the median results in an easier method, because it is simpler to compute than the mean value by taking only the middlemost value of the reference set.

Next, in step 312, the greatest element of the reference set is compared with the reference value. In step 314, it is studied whether a given ending condition is fulfilled. This takes place for instance by studying whether the greatest element of the reference set is greater than the reference value. If it is observed in step 314 that the greatest value of the reference set is smaller than the reference value, the ending condition is not fulfilled, and one moves on to step 316, where the number of reference set elements is increased for forming a new reference set. The number to be increased is for example one, whereby the new reference set formed in step 309 is supplemented with that element of the absolute value set which is next greatest compared with the greatest element of the reference set. From step 314, the process thus moves on to step 309, where a new reference set is formed on the basis of the number of elements selected to the new reference set, determined in step 316. After this, one moves on stepwise until in step 314 the greatest element of the reference set is greater than the reference value or until steps 309, 310, 312, 314 and 316 have been reiterated successively a predetermined number of times successively. The ending condition can thus be fulfilled for instance when the greatest element of the reference set is greater than the reference value or when steps 309, 310, 312, 314 and 316 have been reiterated successively a predetermined number of times. If the ending condition is fulfilled in step 314, in other words if, for instance, the greatest element of the reference set is greater than the reference value, one moves on to step 318. In step 318, an accepted sample set is formed by deleting the greatest element from the remaining reference set.

Thus, after setting the reference set, more elements of the absolute value set are taken to the reference set until a predetermined reference value is not exceeded. The method functions well, because the interference impulses have higher absolute values than other sample set elements. Since the sample set variance does not have to be known when the threshold value is determined, the sample set can also be a direct sequence signal, for example, which is below Gaussian noise with zero mean (thermal noise). Such is the case for instance in spread-spectrum systems, where signal-noise ratio at chip level is below zero decibel. The method does not need any advance information on the interference.

When an accepted sample set has been formed in step 318, one can move on to process the obtained noiseless sample set further in a desired manner. Accurate power estimation, for example, is now possible. Power estimation can be performed, for instance, by using a so-called classical power estimator, whereby the power estimation is performed on the basis of the mean of the squares of the absolute values of the elements in the accepted sample set by using formula (1), or on the basis of the mean of the squares of the elements in the accepted absolute value set by using formula (2):

$$P_{clas} = \frac{1}{N}\sum_{i=1}^{N}|y_i|^2 \quad (1)$$

$$P_{clas} = \frac{1}{N}\sum_{i=1}^{N}x_i^2 \quad (2)$$

wherein:

$P_{clas}$ is power,

N is the number of elements, $|y_i|$ is the absolute value of the element of the accepted sample set, $x_i$ is an element of the accepted absolute value set.

Power estimation can also be carried out by a method that is based on Rayleigh distribution, whereby the power estimation is performed by means of formula (3):

$$P_{ray} = \frac{4}{\pi}\left(\frac{1}{N}\sum_{i=1}^{N}x_i\right)^2 \quad (3)$$

wherein:

$P_{ray}$ is power.

The above method is also suitable for cancelling interference and separating the signal and noise subspaces, since the ability of the method to endure impulsive interference is good. The proposed method can also be used to sort the received signal to acceptable samples and samples to be rejected.

Figure 4:
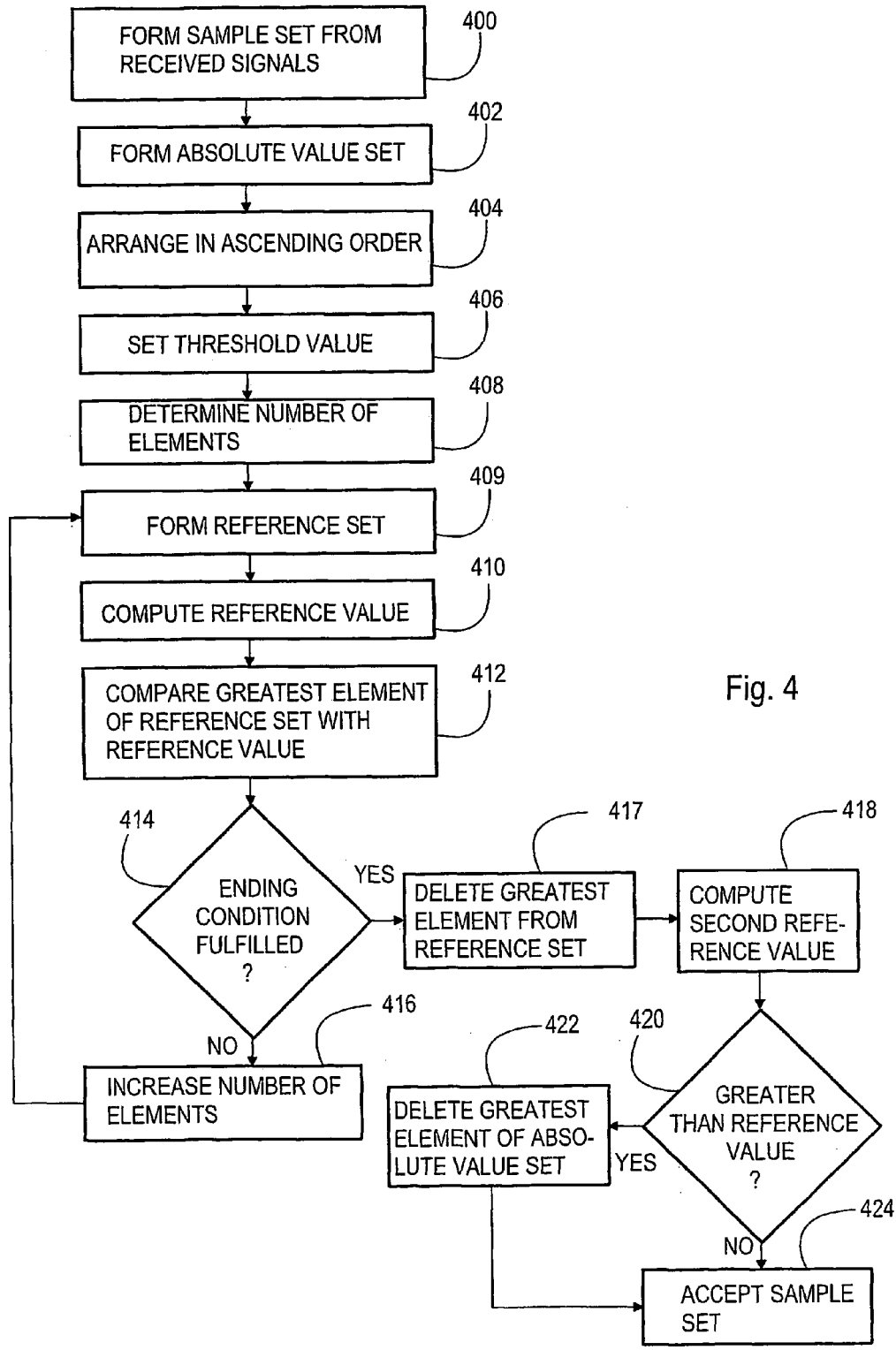
FIG. 4 shows a block diagram of a signal-processing method according to the proposed solution.

Let us next study a method for processing a signal according to an embodiment of the invention, shown in FIG. 4. At first, the method proceeds as the one shown in FIG. 3. In step 400, a sample set is formed from the received signals. Next, in step 402, an absolute value set is formed from the absolute values of the sample set elements. Further, in step 404 the elements of the absolute value set are arranged in the ascending order; in step 406 a threshold value is set; and in step 408 the number of reference set elements is determined. In step 409, a reference set is formed which comprises elements of the absolute value set, the number of which was determined in step 408, in the ascending order. The reference set formed in the example of step 409 contains an odd number of elements.

Next, the process proceeds to step 410, in which a reference value is computed by multiplying the predetermined threshold value by the middlemost element of the reference set, i.e. the reference set median. Further, in step 412 the greatest element of the reference set is compared with the reference value computed in step 410; and in step 414 it is studied whether the ending condition is fulfilled. In step 414, the ending condition is fulfilled if the greatest element of the reference set is greater than the reference value. If the ending condition is not fulfilled, in other words if the greatest element of the reference set is not greater than the reference value, one moves on to step 416, in which the number of elements of the reference set is increased for forming a new reference set. After that, one returns from step 416 to step 409, in which a new reference set is formed on the basis of the number of elements selected to the new reference set, which number was determined in step 416. In step 416, the number of reference set elements to be increased is at least two, or an even number, so that the number of elements remains odd. After step 409, one proceeds stepwise until the ending condition is fulfilled in step 414.

When the greatest element of the reference set is, in step 414, greater than the reference value, one moves on to step 417, where an accepted absolute value set is formed by deleting the greatest element from the remaining reference set. Next, in step 418, a second reference value is formed by multiplying the threshold value with the mean of the middlemost element and the element preceding it in the accepted absolute value set. In step 420, the greatest element of the accepted absolute value set is compared with the second reference value; in other words, it is studied whether the greatest value of the accepted absolute value set is greater than the second reference value. If, in step 420, it is observed that the greatest element of the accepted absolute value set is greater than the second reference value, one moves on to step 422, in which the greatest element is deleted from the accepted absolute value set. From step 422, one can move on to step 424, where the remaining absolute value set is accepted. If, in step 420, it is observed that the greatest element of the accepted absolute value set is not greater than the second reference value, one moves on to step 424, where the accepted absolute value set and the accepted sample set corresponding to it are preserved.

Figure 5:
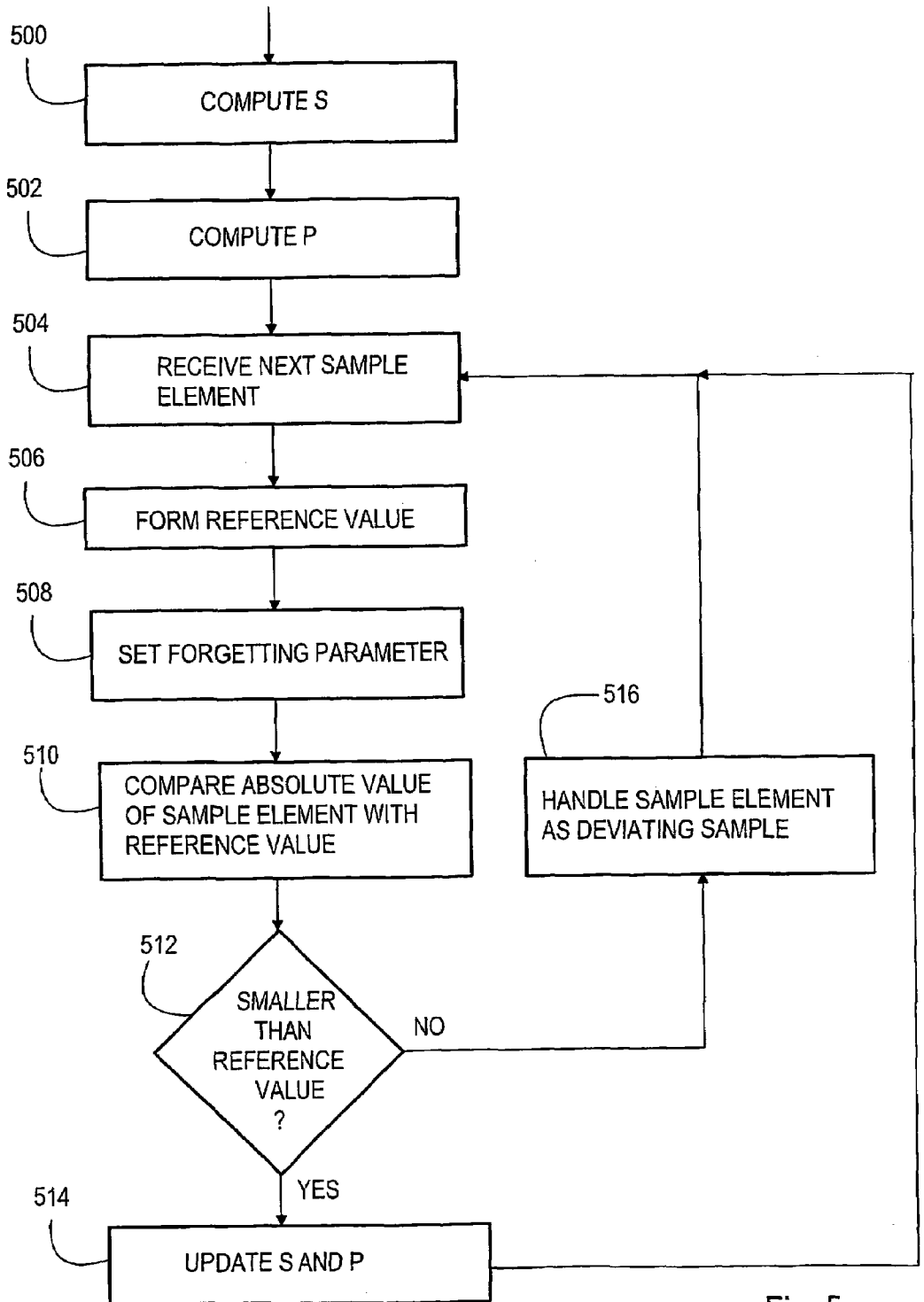
FIG. 5 shows a block diagram of a signal-processing method according to the proposed solution.

FIG. 5 shows what is called an adaptive embodiment of the invention. The method of FIG. 5 comprises defining preset parameters, which are obtained by, for example, performing the method shown in FIG. 3 once. Thus, the steps of FIG. 5 can be performed after the steps shown in FIG. 3, for example. In steps 500 and 502, the preset parameters S and P are computed. S computed in step 500 is obtained by computing the sum of the elements of the accepted absolute value set obtained in the method of FIG. 3, for example. Alternatively, a given value can be defined for S. Step 502 comprises computing P, which is the number of elements of the accepted absolute value set. Alternatively, an appropriate value can be defined for P as well.

In step 504 of FIG. 5, the next sample element is received. In step 506, a third reference value is formed by multiplying the predetermined threshold value by the quotient of S and P. In step 508, a forgetting parameter is set. A forgetting parameter, i.e. an exponential weighting factor, is used in recursive algorithms of the smallest square sum, in which error vectors of the smallest square sum are computed by utilizing all preceding samples. If a sample element obtained long ago is given the same weight as the sample vector just received, poor sample elements from the past can affect the current solution. A forgetting parameter allows determination of how the algorithms handle old samples, in other words how the weights of old and new samples are weighted. The value of the forgetting parameter is between zero and one. If, for instance, one is set as the forgetting parameter, it does not affect the sample element values. Usually the value of the forgetting parameter is set between 0.9 and 1.

In step 510, the absolute value of the sample element is compared with a third reference value. In step 512, it is studied whether the absolute value of the sample element is smaller than the third reference value. If the absolute value of the sample value is not smaller than the third reference value, one moves on to step 516, where the sample element is treated as a deviating sample, i.e. an interference impulse. In step 516, the deviating sample is set to zero, for example. From step 516, one returns to step 504 to receive the following sample element, after which one proceeds stepwise again. If, on the other hand, the absolute value of the sample element is, in step 512, smaller than the third reference value, the process proceeds to step 514, where the values of S and P are updated. In step 514, the values of S and P are updated by computing new values for S and P by means of the forgetting parameter. The new value for S is computed by multiplying the forgetting parameter by S and adding the value of the sample element. The new value for P is computed by multiplying the forgetting parameter by P and by adding number one. The purpose of the forgetting parameter is to allow the method to converge towards the optimal reference value when the statistics of the received samples change. If the absolute value of the sample element is greater than the reference value, in other words if the sample value is an impulse, parameters S and P are not updated. After step 514, one returns to step 504 to receive the following sample elements, after which steps 504 to 516 are reiterated a desired number of times or until there are no more sample elements. The desired number for reiterating steps 504 to 516 is one or more.

The adaptive method presented above allows, for example, interference cancellation to be started always when required, without knowing anything about the interference level of the received signal in advance. The adaptive method also works well even if the signal-noise ratio changes in the middle of signal reception. Since in the adaptive method only one sample element is handled at a time, also the delay level of the method is low.

The above embodiments of the invention work well at a very high frequency of impulse interference, for example at a frequency value 0.5. The lower the frequency of impulse interference is, the better the presented methods work. The methods also work in interference-free cases. The lower the impulse-noise frequency is, the better the methods work, irrespective of the power of the impulse noise. Thus, also low-frequency interference can be cancelled with the method. The methods function even if up to 80 to 90% of the samples are interference impulses.

Although the invention has been described above with reference to the example of the attached drawings, it is obvious that the invention is not restricted to it but can be modified in a variety of ways within the inventive idea of the attached claims.

The invention claimed is:

1. A method for processing and detecting a signal in a telecommunications system, the method comprising:
    forming a sample set from received signal and forming a set of absolute values from absolute values of sample set elements, the method further comprising:
    arranging the elements of the absolute value set in the ascending order;
    setting a threshold value;
    determining the number of elements of a reference set to be formed;
    forming a reference set comprising a predetermined number of elements of the absolute value set in the ascending order;
    computing a reference value by multiplying the mean or median of the reference set by the threshold value;
    comparing the greatest element of the reference set with the reference value;
    increasing the number of reference set elements for forming a new reference set when the greatest reference set element is smaller than the reference value;
    reiterating at least one of forming a reference set, computing a reference value, comparing the greatest element of the reference set or increasing the number of reference set elements, until a predetermined ending condition is fulfilled;
    forming an accepted absolute value set and a corresponding sample set by deleting the greatest element from the reference set when the predetermined ending condition is fulfilled for detecting the signal.

2. A method according to claim 1, wherein the threshold value is set according to Rayleigh distribution.

3. A method according to claim 1, wherein the ending condition is fulfilled when the greatest element of the reference set is greater than the reference value.

4. A method according to claim 1, the method further comprising estimating the power of the received signal on the basis of the mean of the squares of the absolute values of the elements in the accepted sample set.

5. A method according to claim 1, the method further comprising estimating the power of the received signal on the basis of the sample set accepted with the Rayleigh distribution method.

6. A method according to claim 1, the method being used for cancelling the interference of the received signal.

7. A method according to claim 1, the method being used for separating signal-noise subspaces of the received signal.

8. A method according to claim 1, the method being used for dividing the received signal into acceptable samples and samples to be rejected.

9. A method according to claim 1, wherein there is an odd number of reference set elements, and the method further comprises:
    forming a second reference value by multiplying the threshold value by the mean of the middlemost element and the element preceding it in the absolute value set;
    comparing the second greatest element of the absolute value set with the second reference value;
    deleting the greatest element from the accepted absolute value set when the greatest element of the accepted absolute value set is greater than the second reference value;
    preserving the accepted absolute value set and the accepted sample set corresponding to it when the greatest element of the accepted absolute value set is smaller than the second reference value.

10. A method according to claim 1, the method further comprising:
    computing sum S of the elements of the accepted absolute value set;
    computing number P of elements of the accepted absolute value set;
    receiving the following sample element;
    forming a third reference value by multiplying the threshold value by the quotient of S and P;
    setting a forgetting parameter;
    comparing the absolute value of the sample element with a third reference value;
    computing a new value of S by multiplying the forgetting parameter by S and by adding the sample element value when the absolute value of the sample element is smaller than the third reference value;
    computing a new value of P by multiplying the forgetting parameter by P and by adding number one when the absolute value of the sample element is smaller than the third reference value;
    handling the sample value as a deviating sample when the absolute value of the sample element is greater than the third reference value;
    reiterating at least one of receiving the following sample elements, forming a third reference value, setting a forgetting parameter, comparing the absolute value, computing a new value of S, computing a new value of P, or handing the sample value as a deviating sample a desired number of times or until there are no more sample elements for detecting the received.

11. A method according to claim 10, the method comprising setting the sample element handled as a deviating sample to be zero.

12. A method according to claim 10, wherein the forgetting parameter is a value between zero and one.

13. An apparatus for processing and detecting signal comprising:
    sample forming device configured to form a sample set from received signals and absolute value forming device configured to form a set of absolute values from the absolute values of sample set elements, wherein the apparatus further comprises:
    an arranging device configured to arrange the elements of the absolute value set in the ascending order;
    a setting device configured to set a threshold value;
    a determining device configured to determine the number of elements of a reference set to be formed;
    a forming device configured to form a reference set comprising a predetermined number of elements of the absolute value set in the order of magnitude;
    a computing device configured to compute a reference value by multiplying the mean or median of the reference set by the threshold value;
    a comparing device configured to compare the greatest element of the reference set with the reference value;

an increasing device configured to increase the number of reference set elements for forming a new reference set when the greatest reference set element is smaller than the reference value;

an iterating device configured to reiterate at least one of arranging, setting, determining, forming, computing, comparing or increasing until a predetermined ending condition is fulfilled;

a forming device configured to form an accepted absolute value set and a corresponding sample set by deleting the greatest element from the reference set when the predetermined ending condition is fulfilled for detecting the signal.

14. The apparatus according to claim 13, wherein the setting device is configured to set the threshold value on the basis of Rayleigh distribution.

15. The apparatus according to claim 13, wherein the apparatus comprises an observing device configured to observe that the greatest element is greater than the reference set and an indicating device configured to indicate that the ending condition has been fulfilled.

16. The apparatus according to claim 13, wherein the apparatus comprises an estimating device configured to estimate the power of the received signal on the basis of the mean of the squares of the absolute values in the accepted sample set.

17. The apparatus according to claim 13, wherein the apparatus comprises an estimating device configured to estimate the power of the received signal on the basis of the sample set accepted with the Rayleigh distribution method.

18. The apparatus according to claim 13, wherein the apparatus is arranged to cancel interference of the received signal.

19. The apparatus according to claim 13, wherein the apparatus is arranged to separate signal-noise subspaces of the received signal.

20. The apparatus according to claim 13, wherein the apparatus is arranged to divide the received signal into acceptable samples and samples to be rejected.

21. The apparatus according to claim 13, wherein there is an odd number of elements in the reference set and the receiver further comprises:
 a forming device configured to form a second reference value by multiplying the threshold value by the mean of the middlemost element and the element preceding it in the accepted absolute value set;
 a comparing device configured to compare the greatest value of the accepted absolute value set with the second reference value;
 a deleting device configured to delete the greatest element from the accepted absolute value set when the greatest element of the accepted absolute value set is greater than the second reference value;
 a preserving device configured to preserve the remaining absolute value set and the accepted sample set corresponding to it when the greatest value of the accepted absolute value set is smaller than the second reference value.

22. The apparatus according to claim 13, wherein the apparatus further comprises:
 a computing device configured to compute sum S of the elements of the accepted absolute value set;
 a computing device configured to compute number P of elements of the accepted absolute value set;
 a receiving device configured to receive the following sample element;
 a forming device configured to form a third reference value by multiplying the threshold value by the quotient of S and P;
 a setting device configured to set a forgetting parameter;
 a comparing device configured to compare the absolute value of the sample element with the third reference value;
 a computing device configured to compute a new value of S by multiplying the forgetting parameter by S and by adding the sample value when the absolute value of the sample is smaller than the third reference value;
 a computing device configured to compute a new value of P by multiplying the forgetting parameter by P and by adding number one when the absolute value of the sample element is smaller than the third reference value;
 a handling device configured to handle the sample value as a deviating sample when the absolute value of the sample element is greater than the third reference value;
 an iterating device configured to reiterate at least one of receiving, forming, setting, comparing, computing a new value of S, computing a new value of P or handling, a desired number of times or until there are no more sample elements.

23. The apparatus according to claim 22, wherein the apparatus is arranged to set the sample element handled as a deviating sample to be zero.

24. The apparatus according to claim 22, wherein the apparatus is arranged to set the value of the forgetting parameter between zero and one.

25. A receiver for processing and detecting a signal, comprising:
 means for forming a sample set from received signals and means for forming a set of absolute values from the absolute values of sample set elements,
 arranging means for arranging the elements of the absolute value set in the ascending order;
 setting means for setting a threshold value;
 determining means for determining the number of elements of a reference set to be formed;
 forming means for forming a reference set comprising a predetermined number of elements of the absolute value set in the order of magnitude;
 computing means for computing a reference value by multiplying the mean or median of the reference set by the threshold value;
 comparing means for comparing the greatest element of the reference set with the reference value;
 increasing means for increasing the number of reference set elements for forming a new reference set when the greatest reference set element is smaller than the reference value;
 iterating means for reiterating the preceding steps D to G until a predetermined ending condition is fulfilled;
 forming means for forming an accepted absolute value set and a corresponding sample set by deleting the greatest element from the reference set when the predetermined ending condition is fulfilled for detecting the signal.

* * * * *